US009956935B2

(12) United States Patent
Kawamura et al.

(10) Patent No.: US 9,956,935 B2
(45) Date of Patent: May 1, 2018

(54) FOLDING COMPLETION BODY OF AIRBAG AND AIRBAG

(71) Applicant: TOYODA GOSEI CO., LTD., Kiyosu-shi, Aichi-ken (JP)

(72) Inventors: Koji Kawamura, Kiyosu (JP); Masaaki Okuhara, Kiyosu (JP); Yuji Sato, Kiyosu (JP); Takuya Hiraiwa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days. days.

(21) Appl. No.: 15/260,988

(22) Filed: Sep. 9, 2016

(65) Prior Publication Data

US 2017/0088084 A1    Mar. 30, 2017

(30) Foreign Application Priority Data

Sep. 29, 2015  (JP) ................................. 2015-191985

(51) Int. Cl.
*B60R 21/232* (2011.01)
*B60R 21/237* (2006.01)
*B60R 21/213* (2011.01)

(52) U.S. Cl.
CPC .......... *B60R 21/232* (2013.01); *B60R 21/213* (2013.01); *B60R 21/237* (2013.01)

(58) Field of Classification Search
CPC ... B60R 21/213; B60R 21/232; B60R 21/237; B60R 2021/23386
See application file for complete search history.

(56) References Cited

U.S. PATENT DOCUMENTS

| | | | | |
|---|---|---|---|---|
| 6,361,068 | B1 * | 3/2002 | Stein | B60R 21/232 280/730.2 |
| 6,565,118 | B2 * | 5/2003 | Bakhsh | B60R 21/232 280/730.2 |
| 7,125,037 | B2 * | 10/2006 | Tallerico | B60R 21/201 280/728.2 |
| 7,172,212 | B2 * | 2/2007 | Aoki | B60R 21/213 280/730.2 |
| 7,264,267 | B2 * | 9/2007 | Kino | B60R 21/232 280/728.2 |

(Continued)

FOREIGN PATENT DOCUMENTS

JP       2011-068159 A       4/2011
JP       2014218117 A    *  11/2014

*Primary Examiner* — Laura Freedman
(74) *Attorney, Agent, or Firm* — Posz Law Group, PLC

(57) ABSTRACT

In a folding completion body of an airbag, the airbag includes: an airbag body configured to be stored on an upper edge of a window on an inboard side of a vehicle; and a plurality of mounting pieces which extend from an upper edge of the airbag body and mount the airbag body to the upper edge of the window, the lower edge of the airbag body in a flatly deployed state is folded to be brought close to the upper edge so as to form a folded body; a folding-collapse preventing member is assembled to the folded body; and the mounting piece with the lug is folded and superimposed to the upper edge of the airbag body in the folded body, and the lug is interposed between the folding-collapse preventing member and a surface of the folded body so as to be fixed to the folded body.

8 Claims, 15 Drawing Sheets

(56) References Cited

U.S. PATENT DOCUMENTS

| | | | | |
|---|---|---|---|---|
| 7,331,602 | B2 * | 2/2008 | Ochiai | B60R 21/217 280/728.2 |
| 7,357,408 | B2 | 4/2008 | Hall et al. | |
| 7,380,815 | B2 * | 6/2008 | Rose | B60R 21/213 280/728.2 |
| 7,547,038 | B2 * | 6/2009 | Coleman | B60R 21/213 248/200 |
| 7,641,220 | B2 * | 1/2010 | Visker | B60R 21/20 24/295 |
| 7,748,734 | B2 * | 7/2010 | Wilmot | B60R 21/201 280/728.2 |
| 7,823,914 | B2 * | 11/2010 | Cheal | B60R 21/201 280/728.2 |
| 7,823,922 | B2 * | 11/2010 | Mitchell | B60R 21/232 280/730.2 |
| 7,862,075 | B2 * | 1/2011 | Minamikawa | B60R 21/213 280/728.2 |
| 7,980,585 | B2 * | 7/2011 | Cheal | B60R 21/201 280/728.2 |
| 7,988,191 | B2 * | 8/2011 | Weyrich | B60R 21/231 280/736 |
| 8,056,924 | B2 * | 11/2011 | Hatfield | B60R 21/201 280/728.2 |
| 8,091,918 | B2 * | 1/2012 | Mitchell | B60R 21/201 280/728.2 |
| 8,240,701 | B2 * | 8/2012 | Cheal | B60R 21/201 280/728.2 |
| 8,414,014 | B2 * | 4/2013 | Nogami | B60R 21/213 280/728.2 |
| 8,636,301 | B1 * | 1/2014 | Wang | B60R 21/232 280/730.2 |
| 8,678,428 | B2 * | 3/2014 | Kraft | B60R 21/232 280/728.2 |
| 8,820,779 | B1 * | 9/2014 | Low | B60R 21/232 280/728.2 |
| 8,894,094 | B2 * | 11/2014 | Wang | B60R 21/232 280/730.2 |
| 9,487,175 | B2 * | 11/2016 | Noma | B60R 21/201 |
| 9,505,371 | B2 * | 11/2016 | Kawamura | B60R 21/2334 |
| 9,610,916 | B2 * | 4/2017 | Kawamura | B60R 21/232 |
| 9,731,676 | B2 * | 8/2017 | Nagasawa | B60R 21/232 |
| 2014/0217707 | A1 * | 8/2014 | Konishi | B60R 21/213 280/728.2 |
| 2017/0088082 | A1 * | 3/2017 | Okuhara | B60R 21/213 |
| 2017/0088083 | A1 * | 3/2017 | Hiraiwa | B60R 21/23138 |
| 2017/0182964 | A1 * | 6/2017 | Konaka | B60R 21/213 |
| 2017/0247008 | A1 * | 8/2017 | Witt, Jr. | B60R 21/213 |

* cited by examiner

FOLDING COMPLETION BODY OF AIRBAG AND AIRBAG

CROSS-REFERENCE TO RELATED APPLICATION(S)

This application is based upon and claims the benefit of priority from Japanese Patent Application No. 2015-191985, filed on Sep. 29, 2015, the entire contents of which are incorporated herein by reference.

BACKGROUND

1. Field of the Invention

The present invention relates to a folding completion body of an airbag which is configured to be mountable on the upper periphery of a window on the inboard side of a vehicle and be stored in a folded-up state, and to be deployed downward to cover the inboard side of the window at the time of inflow of an inflation gas, and an airbag.

2. Description of the Related Art

In the related art, an airbag of a head-protecting airbag device includes an airbag body configured to be stored in a folded-up state on the upper periphery of a window on the inboard side of a vehicle and to be deployed downward to cover the inboard side of the window at the time of inflow of an inflation gas, and a plurality of mounting pieces which extends from the upper periphery of the airbag body and mounts the airbag body on the upper periphery of the window (for example, see JP-A-2011-068159 and U.S. Pat. No. 7,357,408). In a case where a length dimension of the mounting piece protruding from the upper periphery of the airbag body is long, in order not to expose the folding completion body to the window when the folding completion body formed by folding the airbag is mounted at a proper position on the upper edge of the window, the mounting piece is folded to shorten the length dimension of the mounting piece, and further the mounting piece is sewed by a suture, which is breakable when the airbag is deployed, or a breakable tape material is wound on the superimposed portion of the mounting piece so as to maintain the folded shape.

In the conventional folding completion body of an airbag, however, the mounting piece is partially folded and superimposed to be sewed, or the superimposed portion of the mounting piece is wound by the tape material. Thus, when the folding completion body of the airbag is formed in such a manner that the lower edge of the airbag body is folded to be brought close to the upper edge, and a folding-collapse preventing member is assembled to prevent the folding-collapse, it is necessary to perform an operation to sew the mounting piece and wind the tape material as a separate process from the assembly process of the folding-collapse preventing member, and it takes an effort to shorten the mounting piece in order to mount the folding completion body of the airbag at a proper position of the upper periphery of the window.

SUMMARY

The present invention is made to solve the above-described problem, and an object of the invention is to provide a folding completion body of an airbag which can be simply mounted at a proper position of an upper periphery of a window, and an airbag which is suitable for the folding completion body.

According to an aspect of the present invention, there is provided a folding completion body of an airbag, the airbag including: an airbag body configured to be stored on an upper edge of a window on an inboard side of a vehicle in a folded-up state, and to be deployed and inflated downward to cover an inboard side of the window at the time of inflow of an inflation gas; and a plurality of mounting pieces which extend from an upper edge of the airbag body and mount the airbag body to the upper edge of the window, wherein: the airbag is stored in the upper edge of the window in such a manner that a lower edge of the airbag body in a flatly deployed state is folded to be brought close to the upper edge; the plurality of mounting pieces are mounted to the upper periphery of the window with at least one of the mounting pieces folded to be shortened; the lower edge of the airbag body in a flatly deployed state is folded to be brought close to the upper edge so as to form a folded body; a folding-collapse preventing member is assembled to the folded body; the mounting piece folded to be shortened has a lug which protrudes sideward between a base portion on the upper edge of the airbag body and a mounting portion mounted on the upper edge of the window; and the mounting piece with the lug is folded and superimposed to the upper edge of the airbag body in the folded body, and the lug is interposed between the folding-collapse preventing member assembled to the folded body and a surface of the folded body so as to be fixed to the folded body.

The folding completion body according to the present invention, when the lower edge of the airbag body is folded to brought close to the upper edge so as to form the folded body, and the folding-collapse preventing member is assembled to the folded body, simply, the mounting piece with the lug is folded and superimposed on the upper periphery of the airbag body in the folded body, and is interposed between the folding-collapse preventing member and the folded body using the folding-collapse preventing member assembled to the folded body, and the lug is fixed to the folded body. Comparing to a case in which a single mounting piece is shortened by sewing or with a tape material, the mounting piece with the lug can be simply shortened to obtain a predetermined folding completion body in the state of preventing the folding-collapse of the folded body.

In the folding completion body of the airbag according to the present invention, therefore, the mounting piece can be simply shortened simply using the folding-collapse preventing member, and the folding completion body can be configured to be easily mountable to a proper position on the upper edge of the window.

In the folding completion body of the present invention, the plurality of mounting pieces may include a lug mounting piece with the lug and a lugless mounting piece which is not folded for shortening.

With such a configuration, the operation is completed without shortening the entire mounting piece, and it is possible to improve a freedom degree of disposing the folding-collapse preventing member assembled to the folded body.

In the folding completion body of the present invention, in a length dimension of the mounting piece from the base portion on the upper edge of the airbag body to the mounting portion mounted to the upper edge of the window, a length dimension of the lugless mounting piece may be substantially the same as a length dimension of the lug mounting piece in a state where the lug is fixed to the folded body by the folding-collapse preventing member.

With such a configuration, all the plurality of the mounting pieces protruding upward from the folding completion body are set to have the same height position of the mounting portion from the folded body. The vertical space, to which the folding completion body is mounted, on the upper edge of the windows of the vehicle is set to be equally small along the entire length of the folding completion body. Therefore, the space where the folding completion body is mounted to the vehicle can be set not to be bulky, and the height position of the mounting portion of the mounting piece can be aligned so as to improve mounting operability of the mounting piece.

In the folding completion body of the present invention, the lug may be disposed on both sides of the mounting piece with the lug.

With such a configuration, the lugs on both sides can be fixed to the folded body so that the mounting piece folded to be shortened can be stably mounted to the upper edge of the window in an uninclined state.

In the folding completion body of the present invention, the airbag body may be disposed to cover the window on the inboard side of the side surface of the vehicle, and the entire mounting piece may be mounted to a roof side rail of the vehicle.

With such a configuration, when the folding completion body is stored in the roof side rail, which is a storage portion in the vehicle, on the upper edge of the windows using the entire mounting piece including the mounting piece folded to be shortened, the storage portion is a vertically narrow space, but the length dimension of the long mounting piece with the lug can be set to be shorten, and the vertical width dimension of the folding completion body can be set equally small. As a result, the folding completion body can be smoothly mounted and stored in the roof side rail.

In the folding completion body of the present invention, the folded body may include a superimposed portion on an end portion in a front and rear direction, the superimposed portion may have a folded part formed by folding and superimposing the end portion of the flatly deployed airbag body in the front and rear direction on an intermediate portion adjacent to the end portion of the airbag body by attaching a crease extending vertically, the mounting piece with the lug may be disposed in an area of the superimposed portion on the intermediate portion of the airbag body, and the folding-collapse preventing member fixing the lug to the folded body may be disposed to be assembled to the superimposed portion of the folded body.

With such a configuration, although the deployed end portion of the superimposed portion in the airbag body is configured to cover the inboard side of the front pillar extending from the periphery of the roof side rail to the lower edge of the window, the end portion of the inflating airbag body can be stored in the roof side rail, not in the pillar. For this reason, although there is not a storage space of the airbag body in the pillar, it is possible to smoothly cover the inboard side of the pillar with the deployed airbag body, and it is possible to improve the protective performance of an occupant.

With such a configuration, the superimposed portion can be fixed by the folding-collapse preventing member fixing the lug, and without a separate member for preventing springback, the bulky superimposed portion can be fixed while suppressing the increase of the number of the members.

According to another aspect of the present invention, there is provided an airbag including: an airbag body which is configured to be mounted to an upper edge of a window on an inboard side of a vehicle and stored in the folded-up state, and to be deployed downward to cover an inboard side of a window at the time of inflow of an inflation gas; and a plurality of mounting pieces which extend from an upper edge of the airbag body and mount the airbag body to the upper edge of the window, wherein: at least one of the mounting pieces includes a lug which protrudes to both sides between a base portion on the upper edge of the airbag body and a mounting portion mounted to the upper edge of the window; and the lug is disposed in a position which can be superimposed on a portion of the airbag on the upper edge of the airbag body when the mounting piece is folded such that the mounting portion, which is separated from the base portion on the upper edge of the airbag body and mounted to the upper periphery of the window, of the mounting piece with the lug is brought close to the upper edge of the airbag body.

In the airbag according to the present invention, when the mounting piece is folded to be shortened, the lugs which can be superimposed on the airbag on the upper edge of the airbag body protrude to both sides between the base portion and the mounting portion in the mounting piece to be shortened. When the protruding lugs are assembled to the airbag body, on which the folding-collapse preventing member is folded, using the folding-collapse preventing member which is assembled when airbag body is folded, and the lugs are interposed and fixed between the folded airbag body and the folding-collapse preventing member, the mounting portion of the mounting piece with the lug can be simply set to be a stable state without inclined from the airbag body, and the mounting piece can be maintained short. For this reason, when the folding completion body, which is formed by winding the folding-collapse preventing member on the folded airbag body, is mounted on the upper edge of the window of the vehicle, a process to shorten the mounting piece is simply performed.

In the airbag according to the present invention, accordingly, the mounting piece can be easily set to be shortened simply using the folding-collapse preventing member. The mounting piece can be preferably used to the folding completion body configured to be easily mountable to the proper position on the upper edge of the window.

In the airbag according to the present invention, a plurality of the mounting pieces may include a lug mounting piece with the lug and a lugless mounting piece without the lug, and a length dimension of the lug mounting piece from an upper periphery of the lug to the mounting portion may be substantially the same as a length dimension of the lugless mounting piece from the upper edge of the airbag body to the mounting portion.

With such a configuration, when the lug is fixed to the folded airbag body using the folding-collapse preventing member, the height positions of the mounting portions of the lug mounting piece and the lugless mounting piece on the upper edge of the airbag body can be set to be substantially the same as each other. For this reason, all the plurality of the mounting pieces protruding upward from the folding completion body have substantially the same height position of the mounting portion from the upper edge of the airbag body. The vertical space on the upper edge of the window of the vehicle to which the folding completion body is mounted is set to be equally small along the entire length of the folding completion body. Therefore, the space where the folding completion body is mounted to the vehicle can be set not to be bulky, and the height position of the mounting portion of the mounting piece is aligned so as to improve the mounting operability of the mounting piece.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
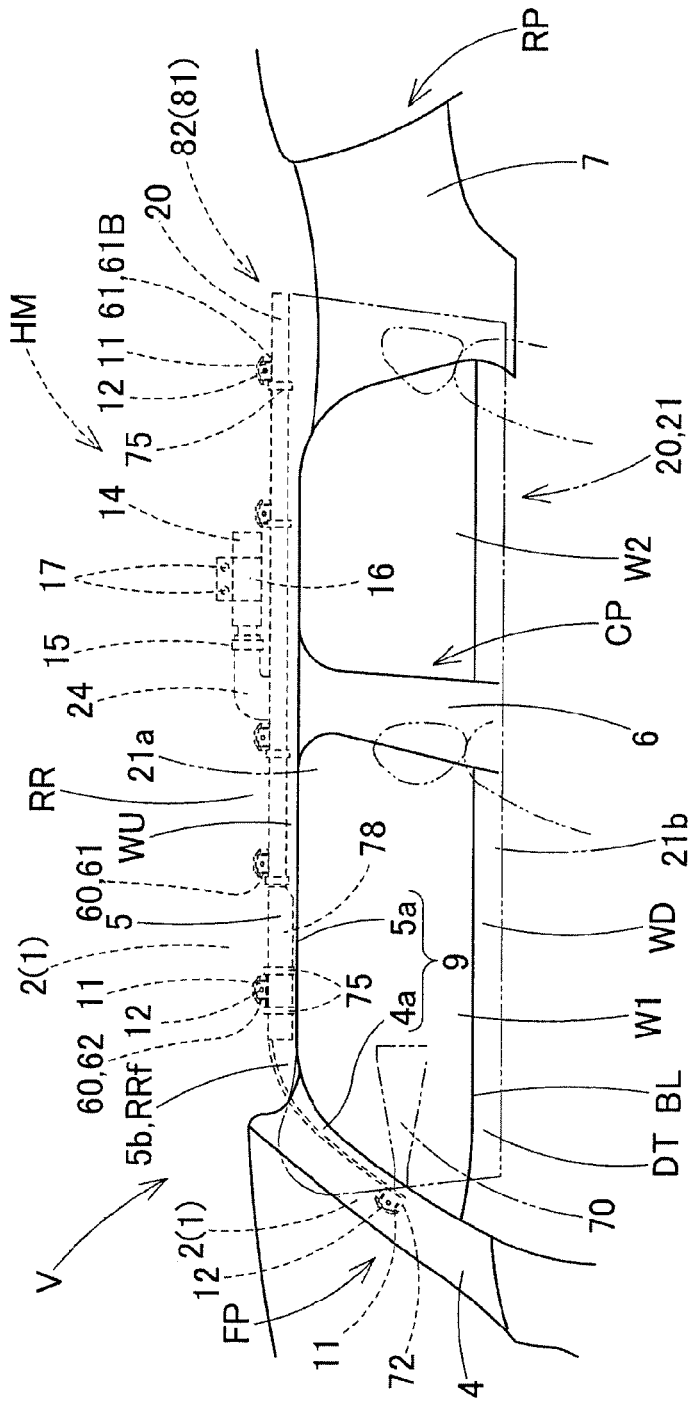
FIG. 1 is a schematic front view illustrating a state in which a head-protecting airbag device using a folding completion body according to an embodiment of the present invention is mounted in a vehicle when viewed from an inboard side.

Hereinafter, an embodiment of the present invention will be described with reference to the drawings. As illustrated in FIG. 1, a head-protecting airbag device HM using a folding completion body 81 of an airbag 20 of the embodiment is mounted on a two-row seat type vehicle V including two windows (side window) W1 and W2. As illustrated in FIG. 1, the head-protecting airbag device HM of the embodiment includes the airbag 20, an inflator 14, mounting brackets 11 and 16, and an airbag cover 9. As illustrated in FIG. 1, the airbag 20 is stored in a folded-up state in an area ranging from the lower edge of a front pillar FP through the lower edge of a roof side rail RR to a region above a rear pillar RP on the upper edge of the windows W1 and W2 in the inboard of the vehicle V.

As illustrated in FIGS. 1 and 13 to 15, the airbag cover 9 includes a front pillar garnish 4 disposed in the front pillar FP, a roof head liner 5 disposed in the roof side rail RR, and respective lower peripheries 4a and 5a thereof. The front pillar garnish 4 and the roof head liner 5 are made of synthetic resin, and are fixedly mounted on an inboard side I in an inner panel 2 on a body (vehicle body) 1 in the front pillar FP and the roof side rail RR, respectively. The airbag cover 9 is configured to cover covers the inboard side I of the airbag 20 stored in the folded-up state, and to be pressed by the airbag 20 to be openable to the inboard side I so that the airbag 20 can protrude downward on the inboard side when being deployed.

The inflator 14 supplies an inflation gas to the airbag 20, the inflator is a substantially cylindrical type as illustrated in FIG. 1, and a gas discharge port (not illustrated) which can discharge the inflation gas is disposed on the tip side thereof. The tip of the inflator 14 including the vicinity of the gas discharge port is inserted to a connection port 24 (to be described later) of the airbag 20, and thus the inflator 14 is coupled with the airbag 20 using a clamp 15 disposed on the outer circumferential side of the connection port 24. The inflator 14 is mounted at a position of the inner panel 2 above the window W2 using the mounting bracket 16 for holding the inflator 14 and a bolt 17 for fixing the mounting bracket 16 in the inner panel 2 on the body 1 (see FIG. 1). The inflator 14 is electrically connected with a control device (not illustrated) of the vehicle V through a lead wire (not illustrated), and is configured to be operated by inputting an operation signal sent from the control device when the control device detects a side collision or an oblique collision, and a rollover of the vehicle V.

The mounting bracket 11 is formed of a two-sheet metal plate, and thus nips the mounting piece 60 (lugless (general) mounting piece 61, lug (end-side) mounting piece 62) or a mounting portion 72 (to be described later) of the airbag 20 from front and back sides so as to be mounted on the mounting piece 60 and mounting portion 72. The mounting piece 60 and the mounting portion 72 are fixedly mounted to the inner panel 2 on the body 1 using a bolt 12 (see FIGS. 13 to 15).

As illustrated in FIGS. 2 to 6, the airbag 20 includes the airbag body 21, the mounting piece 60 fixing the upper periphery 21a of the airbag body 21 to the inner panel 2 on the body 1, and a tension cloth 70 extending from one end (in the case of the embodiment, front end 21c) of the airbag body 21 in the front and rear direction to fix the tip (front end) (mounting portion 72) to the inner panel 2 of the front pillar FP.

Figure 12:
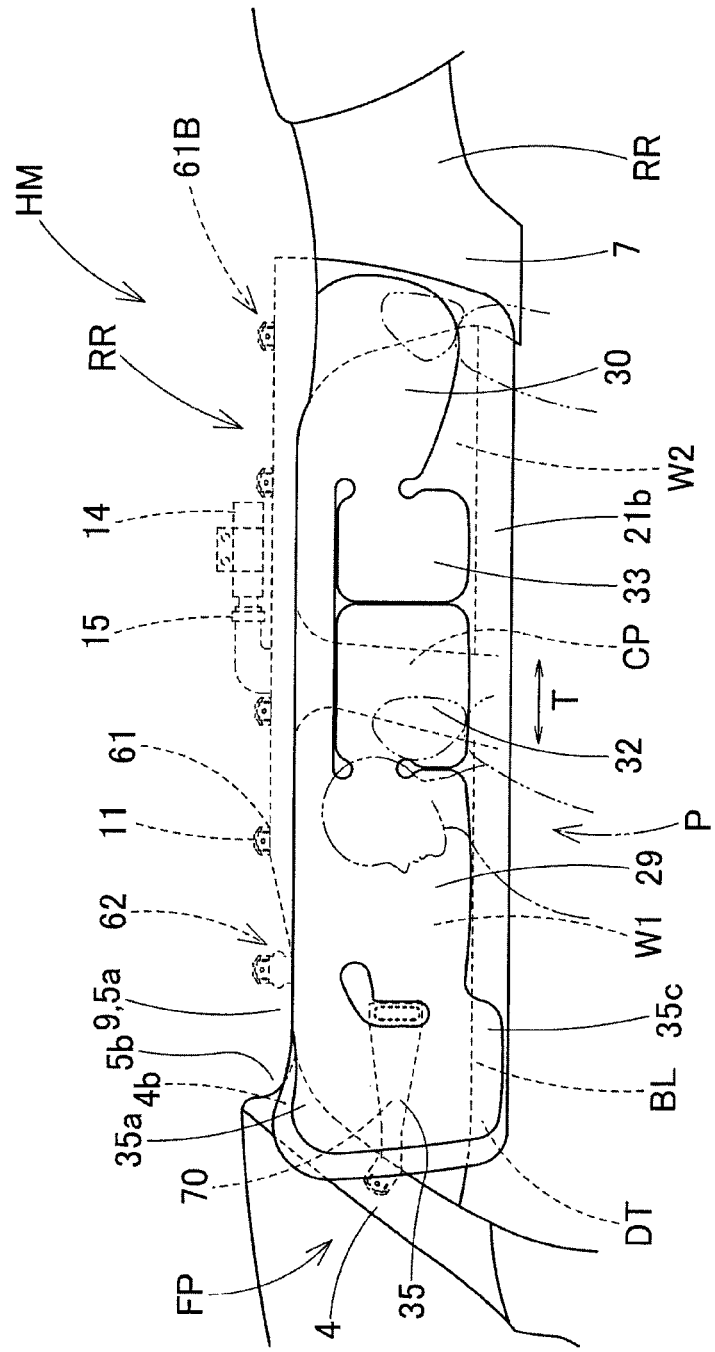
FIG. 12 is a front view schematically illustrating a state in which the airbag of the embodiment is completed to inflate when viewed from the inboard side.

As illustrated by a two-dot chain line of FIG. 1 and in FIG. 12, the airbag body 21 is configured such that the inflation gas is fed from the inflator 14 into the airbag body 21 to deploy the airbag body 21 from a folded-up state, and the airbag body 21 covers the windows W1 and W2 or the inboard side I of the respective pillar garnishes 4, 6, and 7 of the pillars FP, CP, and RP. The outer shape of the airbag body 21 is set to a substantially rectangular shape of which a longitudinal direction substantially accords with the front and rear direction such that the airbag body 21 can covers the inboard side from the window W1 through the center pillar CP and the window W2 to the front side of the rear pillar RP when completing the inflation (see FIGS. 2 and 6). As illustrated in FIG. 12, the vertical width dimension of the airbag body 21 is set such that a lower periphery 21b at the time of completing of the inflation is positioned under a beltline BL configured of the lower periphery of the windows W1 and W2.

In the case of the embodiment, the airbag body 21 is produced of a double weave made of polyimide, polyester, or the like. As illustrated in FIGS. 2 and 4 to 6, the airbag body 21 includes a gas inflow portion 22 which admits the inflation gas to flow to the inside such that the inboard side wall 22a positioned on the inboard side I and the outboard side wall 22b positioned on an outboard side O are separated to inflate a space therebetween at the time of the inflation, and a non-inflow portion 40 which does not admit the inflation gas to flow to inside by combining the inboard side wall 22a and the outboard side wall 22b.

The gas inflow portion 22 includes the cylindrical connection port 24 with an opening 24a through which the inflator 14 is inserted in the rear end, and a protection inflatable portion 25 which is inflatable to be thicker by the inflation gas flowing through the connection port 24. The protection inflatable portion 25 includes a supply passage 27, main inflatable portions 29 and 30, sub inflatable portions 32 and 33, and an end-side inflatable portion 35.

The supply passage 27 is disposed in the front and rear direction to communicate with the connection port 24 in the vicinity of the center of the upper periphery 21a of the airbag body 21 in the front and rear direction so that an inflation gas G flowing from the connection port 24 flows to both front and rear sides.

The main inflatable portion 29 is a front main inflatable portion 29 which communicates a front end 27a of the supply passage 27 with an upper portion 29a, is disposed to cover the window W1 at the time of completing the inflation, and protects the head of an occupant (including a driver seated in a driver seat as well as an occupant seated in a passenger seat) seated in the front seat. The main inflatable portion 30 is a rear main inflatable portion 30 which communicates a rear end 27b of the supply passage 27 with an upper end 30a, is disposed to cover the window W2 at the time of completing the inflation, and protects the head of an occupant seated in the rear seat.

The sub inflatable portion 32 is a front sub inflatable portion 32 which is disposed on the rear side of the front main inflatable portion 29, and is inflatable by the inflation gas G flowing from the front main inflatable portion 29 through an inlet port 32a. The sub inflatable portion 33 is a rear sub inflatable portion 33 which is disposed on the front side of the rear main inflatable portion 30, and is inflatable by the inflation gas G flowing from the rear main inflatable portion 30 through an inlet port 33a. These sub inflatable portions 32 and 33 function as a pressure regulation chamber which allows the inflation gas G to flow from the main inflatable portions 29 and 30 when the main inflatable portions 29 and 30 catch the occupant, and thus suppress a rapid increase of the inner pressure of the main inflatable portions 29 and 30.

The end-side inflatable portion 35 is adjacent to the front main inflatable portion 29 to be disposed on the end side of the airbag body 21 in the front and rear direction, that is, the front end 21c, and is substantially rectangular shape of extending vertically. The end-side inflatable portion 35 is disposed on the downstream side of the inflation gas G from the front main inflatable portion 29 so as to be inflated by the inflation gas G flowing from the front main inflatable portion 29 through upper and lower communication ports 36 and 37. The end-side inflatable portion 35 is disposed to cover the inboard side I from the front portion of the window W1 to the front pillar FP at the time of completing the inflation. The end-side inflatable portion 35 includes an extension portion 35c, which extends downward from the beltline BL on the lower periphery WD of the window W1 and can be supported by a door trim DT as a member on the vehicle body in the lower periphery WD of the window W1, on a lower periphery 35b at the time of completing the inflation (see FIG. 12).

Figure 2:
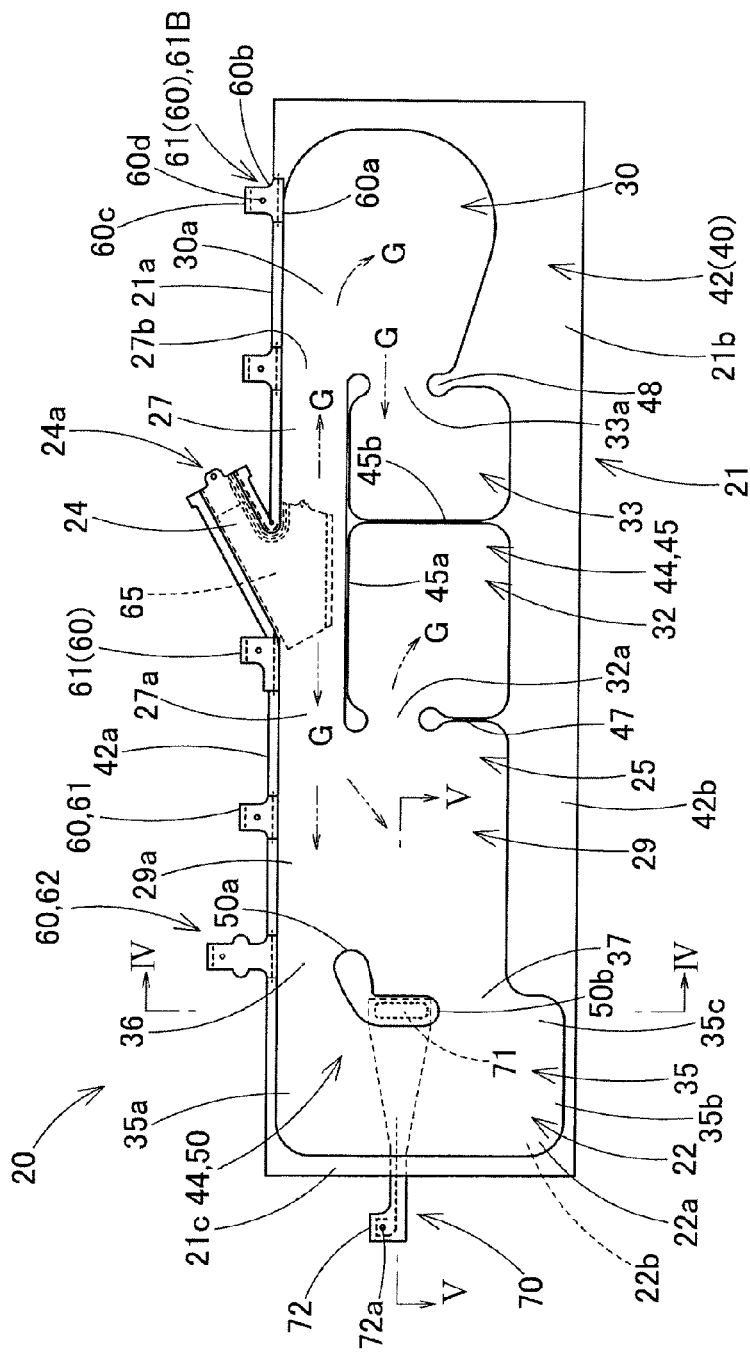
FIG. 2 is a front view illustrating a state in which an airbag used in the embodiment is flatly deployed.
Figure 6:
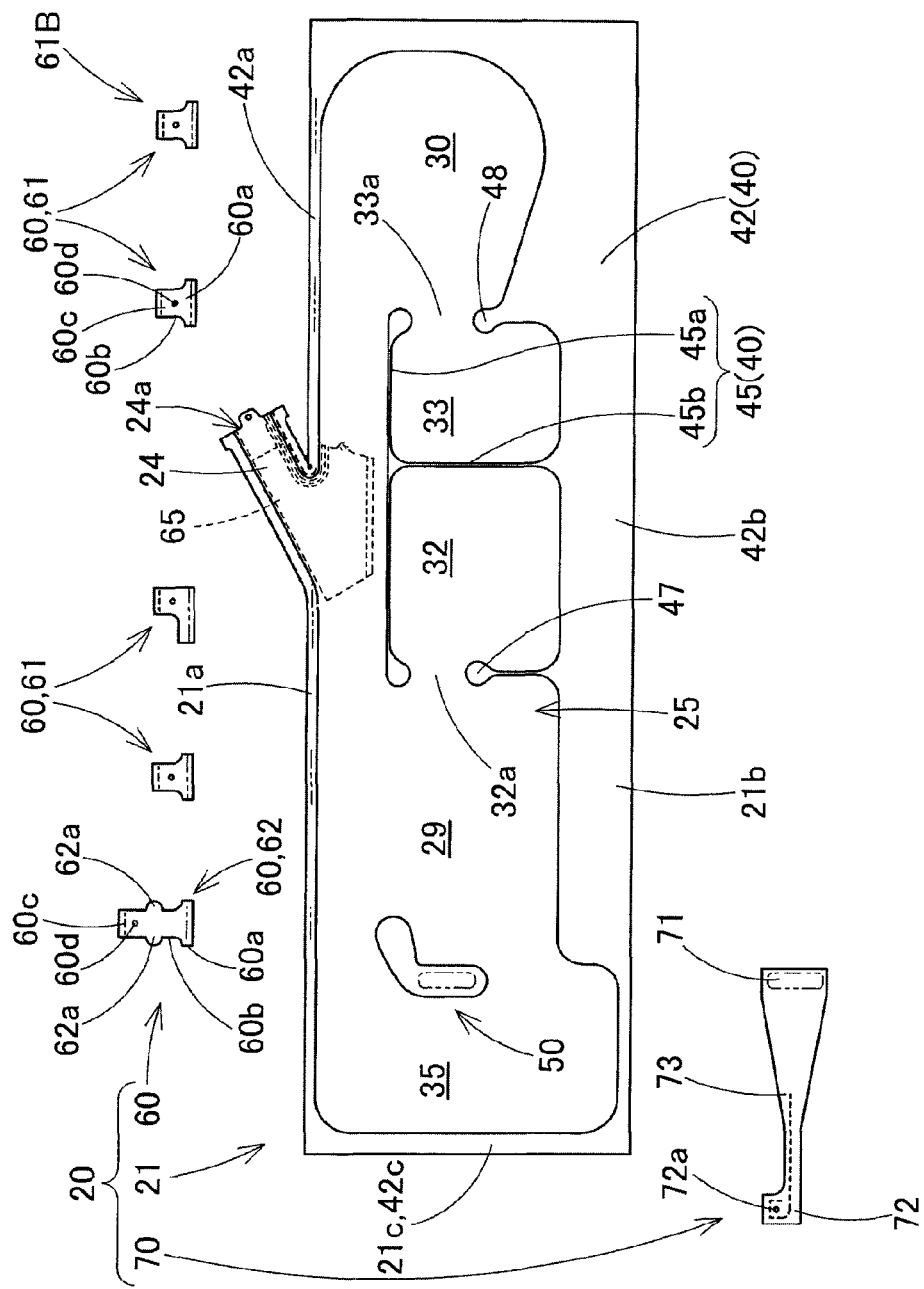
FIG. 6 is a front view illustrating a state in which the mounting piece, the airbag body, and a tension cloth, which configure the airbag of the embodiment, are arranged.

A separate three-forked inner tube 65 is disposed from the connection port 24 of the airbag body 21 to the inner portion of the supply passage 27 near the connection port 24 for enhancing heat resistance (see FIGS. 2 and 6).

The non-inflow portion 40 includes a peripheral portion 42 forming the outer circumferential periphery of the gas inflow portion 22, a closed portion 44 disposed to control the thickness of the protection inflatable portion 25 as an inflatable portion of the gas inflow portion 22 or to partition the protection inflatable portion 25, and a plurality of mounting pieces 60 which are disposed to extend upward on the upper periphery 21a of the airbag body 21 of the airbag 20 and are mounted to an upper periphery WU of the windows W1 and W2.

The peripheral portion 42 is disposed to surround the entire circumference of the gas inflow portion 22 except for the opening 24a of the rear end of the connection port 24.

The closed portion 44 includes a central closed portion 45, a central front lower closed portion 47, a central rear lower closed portion 48, and a boundary closed portion 50. The central closed portion 45 is disposed in a T shape having a lateral rod portion 45a and a vertical rod portion 45b to partition the supply passage 27 and the sub inflatable portions 32 and 33. The vertical rod portion 45b extends upward from the vicinity of the center of a lower periphery 42b of the peripheral portion 42 in the front and rear direction, and partitions the front sub inflatable portion 32 and the rear sub inflatable portion 33. The lateral rod portion 45a extends to both front and rear sides in the upper end of the vertical rod portion 45b, and partitions the supply passage 27 and the front and rear sub inflatable portions 32 and 33 on the lower edge of the supply passage 27.

The central front lower closed portion 47 partitions the front sub inflatable portion 32 and the front main inflatable portion 29, and is disposed to extend in a linear shape upward from a portion of the lower periphery 42b of the peripheral portion 42 directly under the inlet port 32a to form the inlet port 32a between the central front lower closed portion and the front end of the lateral rod portion 45a of the central closed portion 45. The central rear lower closed portion 48 partitions the rear sub inflatable portion 33 and the rear main inflatable portion 30, and is disposed to extend in a linear shape upward from a portion of the lower periphery 42b of the peripheral portion 42 directly under the inlet port 33a to form the inlet port 33a between the central rear lower closed portion and the rear end of the lateral rod portion 45a of the central closed portion 45.

The boundary closed portion 50 is disposed between the front main inflatable portion 29 and the end-side inflatable portion 35 to partition the front main inflatable portion 29 and the end-side inflatable portion 35. In the boundary closed portion 50, both upper and lower ends 50a and 50b are disposed with separated from an upper periphery 42a and the lower periphery 42b of the peripheral portion 42, and the communication ports 36 and 37, which can allow the inflation gas G flowing from the front main inflatable portion 29 to flow to the end-side inflatable portion 35, are disposed between the upper and lower ends 50a and 50b and the upper and lower peripheries 42a and 42b, respectively.

The boundary closed portion 50 includes a vertical closed portion 52, which is disposed substantially vertically in the linear shape, on the lower portion, and an inclined closed portion 54 which is disposed to extend in the linear shape and obliquely in the upper and rear direction from an upper end 52a of the vertical closed portion 52 to the front main inflatable portion 29. In the case of the embodiment, the boundary closed portion 50 is coupled to match with the upper end 52a of the vertical closed portion 52 and the lower end 54b of the inclined closed portion 54, and thus the vertical closed portion 52 and the inclined closed portion 54 are disposed to be integrally connected.

The mounting piece 60 is a portion for mounting the upper periphery 21a of the airbag body 21 to the inner panel 2 on the body 1 of the vehicle V, particularly, in the embodiment, the inner panel 2 of the roof side rail RR, and is disposed at plural positions in the front and rear direction to protrude upward from the upper periphery 21a of the airbag body 21. In the case of the embodiment, the mounting piece 60 is formed of a woven fabric of polyamide, polyester, or the like similarly to the airbag body 21 as a separate member from the airbag body 21, and a wide base portion 60a on the lower end is disposed in the upper periphery 21a of the airbag body 21 by sewing with a suture. A mounting hole 60d through which the mounting bolt 12 penetrates is provided in the upper end portion of the mounting piece 60, and a mounting portion 60c to which the mounting bracket 11 is mounted is disposed therein. The mounting piece 60 has a two plate-folded structure in which the woven fabric made of polyimide, polyester, or the like is folded and superimposed by providing a crease on the upper end (see FIG. 4).

As illustrated in FIG. 2, the mounting piece 60 includes one end-side mounting piece 62 which is disposed on the upper edge of the front end as the end-side inflatable portion 35, and another general mounting piece 61 positioned on the rear side of the end-side mounting piece 62. In the case of the embodiment, the four general mounting pieces 61 are disposed in the front and rear direction.

These general mounting pieces 61 is a portion for fixing the upper edge of the airbag body 21 to the upper periphery WU of the windows W1 and W2. The length dimension LN of the general mounting piece 61 from the upper periphery 21a of the airbag body 21 to the mounting hole 60d of the mounting portion 60c is set to such a dimension that the general mounting piece 61 is not exposed downward from the roof head liner 5 at the time of completing the inflation of the airbag 20, and is entirely covered with the roof head liner 5.

Figure 3:
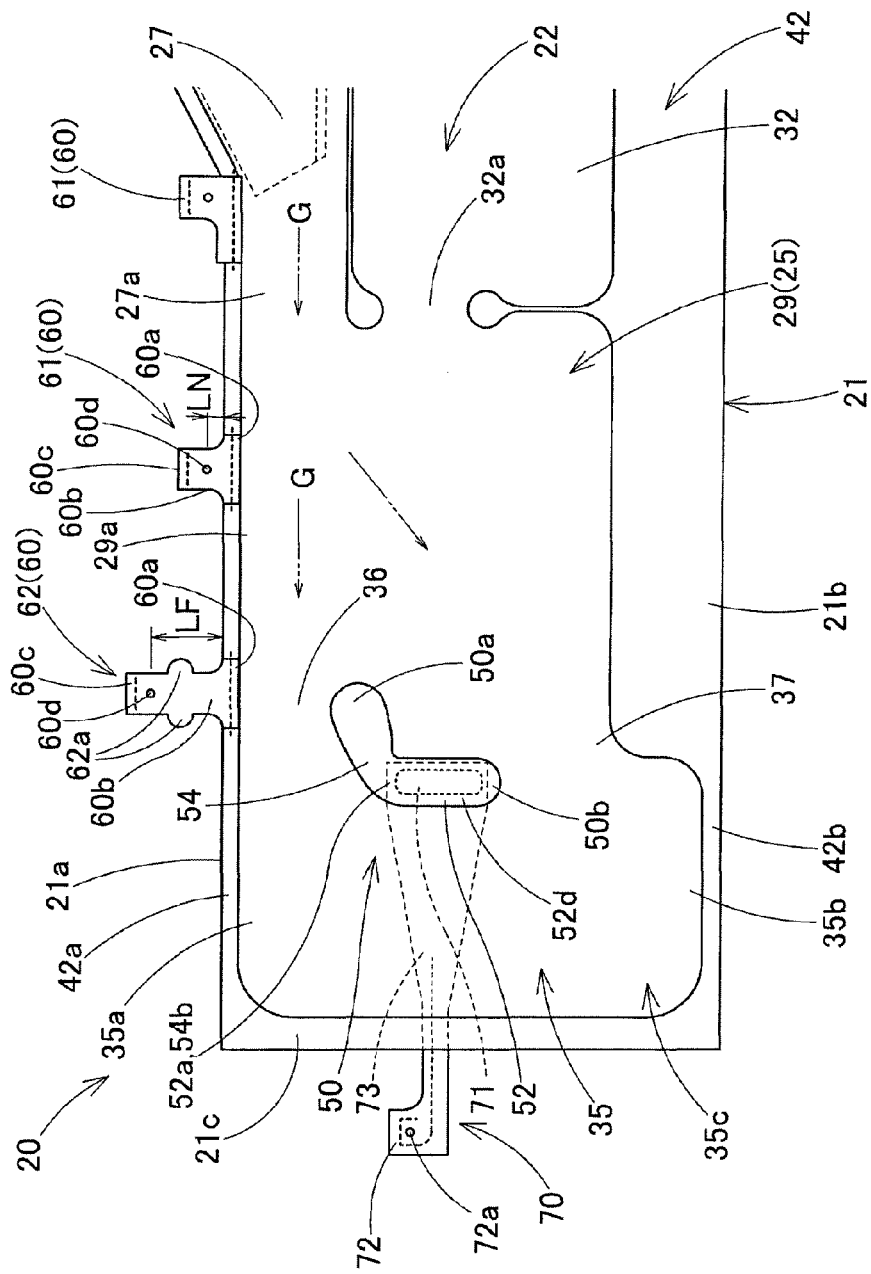
FIG. 3 is a partially-enlarged front view illustrating a vicinity of a lug mounting piece in the airbag according to the embodiment.
Figure 4:
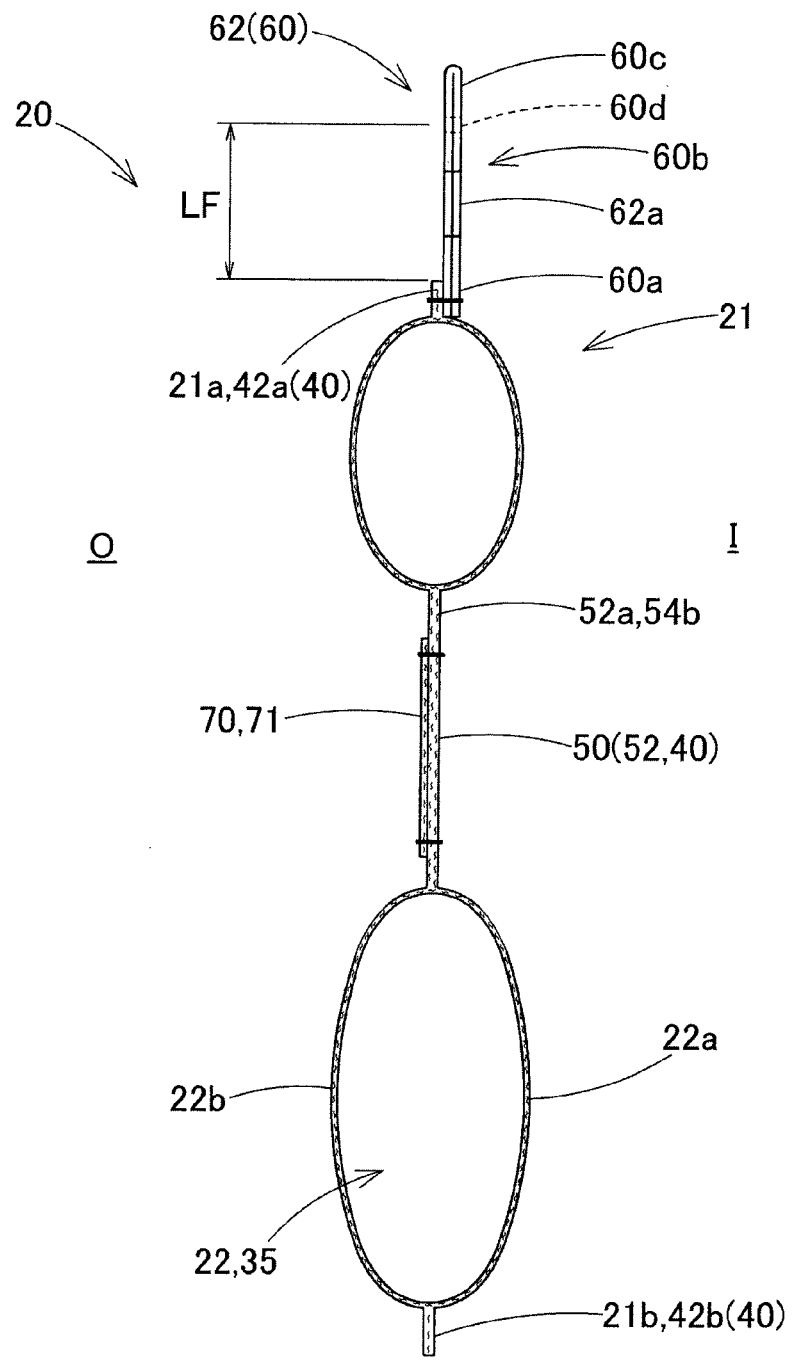
FIG. 4 is a sectional view illustrating an inflated single airbag of the embodiment, and is a partially-enlarged sectional view illustrating a portion taken along line IV-IV of FIG. 2.
Figure 13:
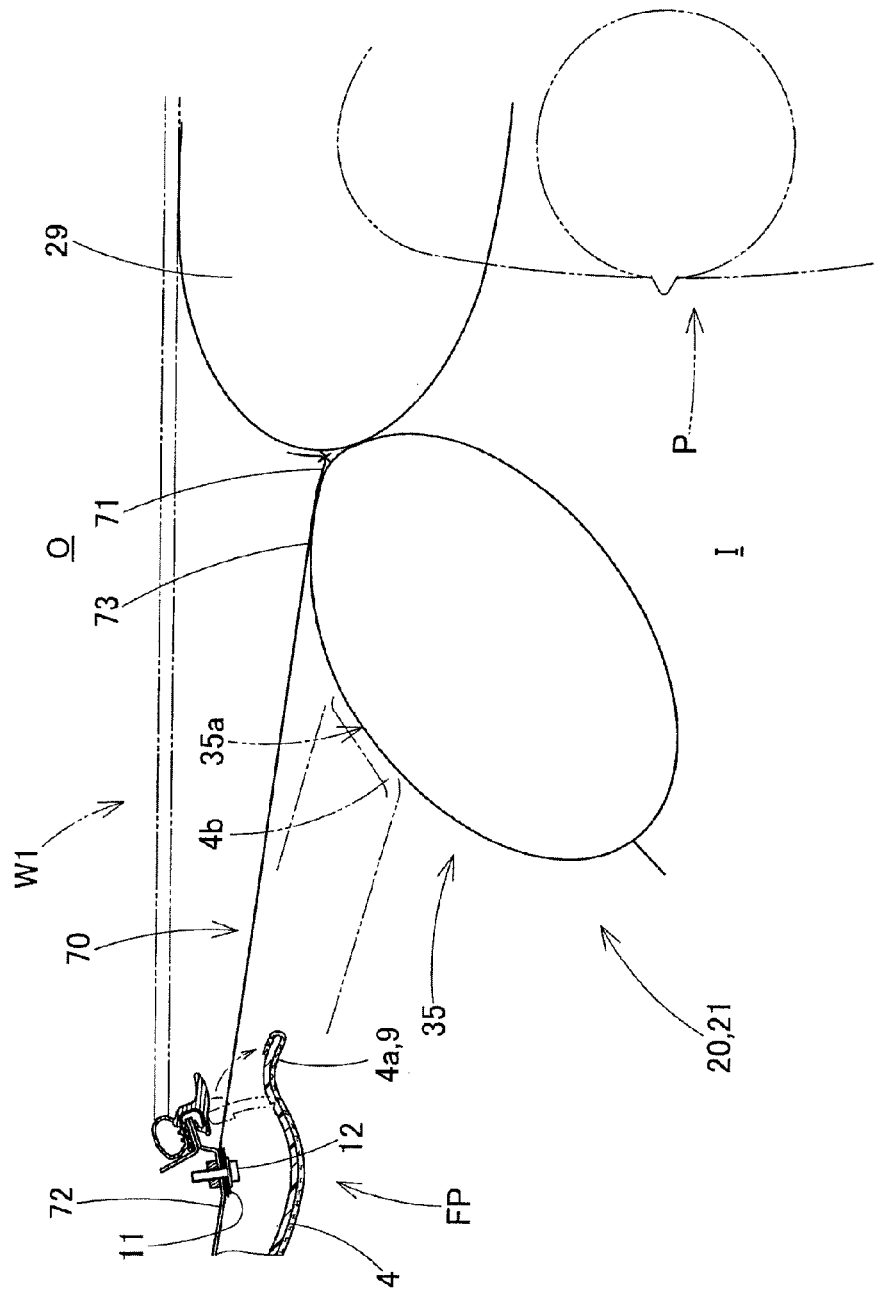
FIG. 13 is a partially-enlarged cross-sectional view schematically illustrating a state in which the airbag of the embodiment is completed to inflate when taken in a front and rear direction.
Figure 14:
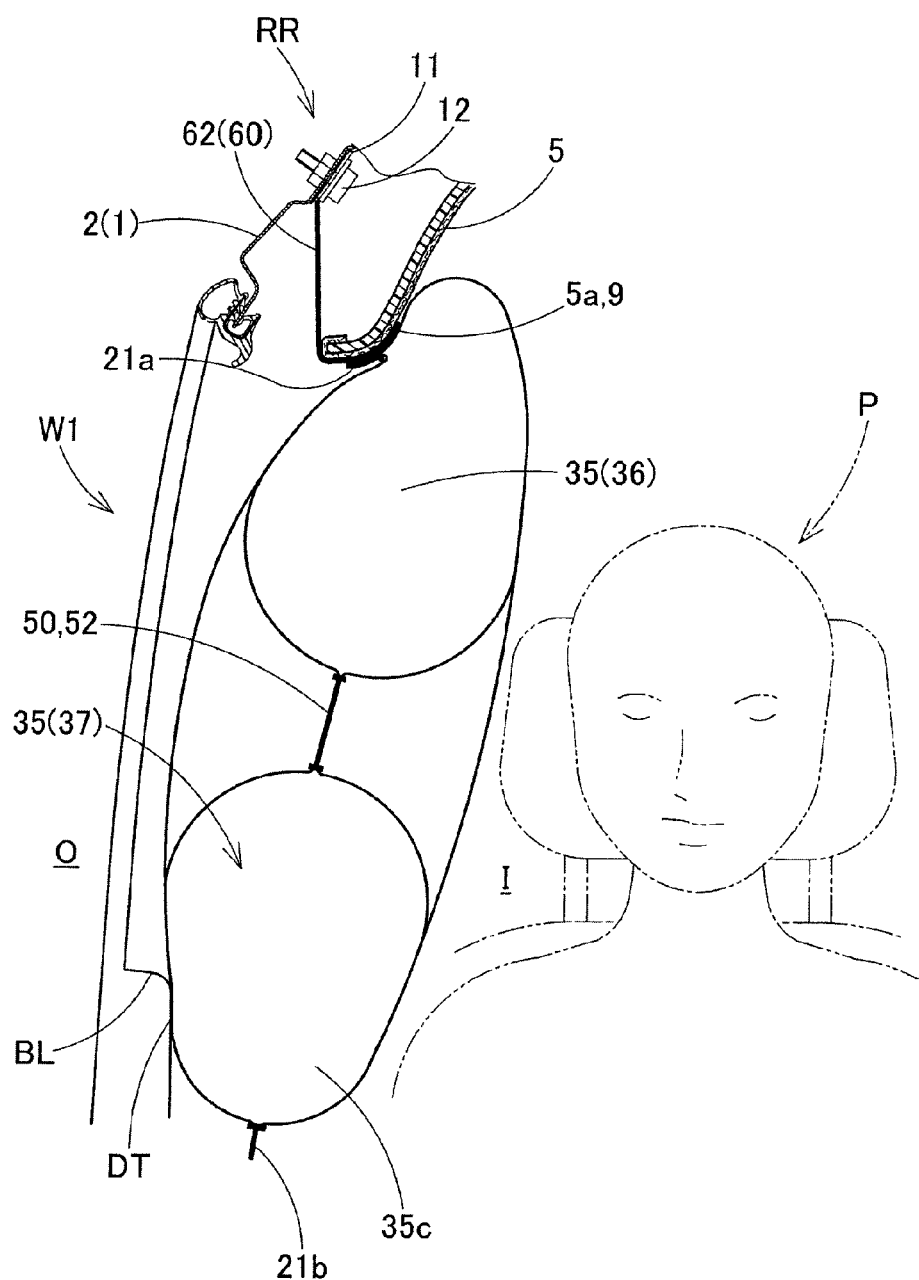
FIG. 14 is a vertical sectional view schematically illustrating a state in which the airbag of the embodiment is completed to inflate when taken vertically, and corresponds to a portion taken along line XIV-XIV in Section B of FIG. 11.

In the case of the embodiment, the end-side mounting piece 62 is disposed to extend upward from the upper periphery 21a of the airbag body 21, which is deviated from the area of the boundary closed portion 50 directly above the vertical closed portion 52 to the rear side of the front main inflatable portion 29, in the vicinity of the boundary closed portion 50, and fixes the mounting portion 60c of the upper end to the inner panel 2 of the roof side rail RR in the vicinity of the front pillar FP. As illustrated in FIGS. 3 and 4, the end-side mounting piece 62 is set such that the length dimension LF from the upper periphery 21a of the airbag body 21 to the mounting hole 60d of the mounting portion 60c in a flatly deployed state is larger than the length dimension LN of the general mounting piece 61 from the upper periphery 21a of the airbag body 21 to the mounting hole 60d. In the case of the embodiment, as illustrated in FIGS. 12 and 13, the end-side inflatable portion 35 is disposed such that an upper periphery 35a covers the inboard side I of an upper portion 4b of the front pillar garnish 4 at the time of completing the inflation of the airbag 20. As illustrated in FIG. 14, the end-side mounting piece 62 is disposed to detour to pass a portion (airbag cover 9) of a lower periphery 5a of the roof head liner 5 at the time of completing the inflation of the airbag 20. For this reason, the length dimension LF of the end-side mounting piece 62 from the airbag body 21 is set such that the end-side inflatable portion 35 is not excessively pulled, and the upper periphery 35a of the end-side inflatable portion 35 is disposed to be supported by the upper portion 4b of the front pillar garnish 4 or a neighboring portion 5b of the roof head liner 5. In the case of the embodiment, the length dimension LF of the end-side mounting piece 62 is set about four times the length dimension LN of the general mounting piece 61.

Figure 15:
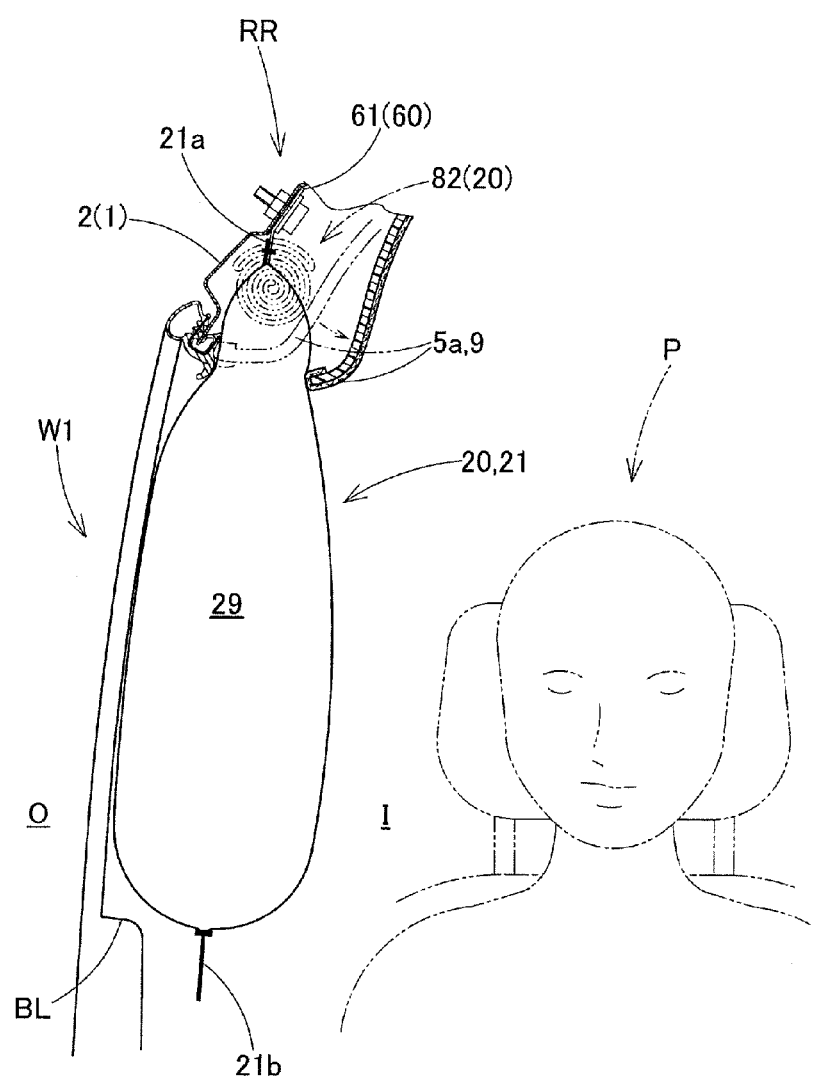
FIG. 15 is a vertical sectional view schematically illustrating a state in which the airbag of the embodiment is completed to inflate when taken vertically, and corresponds to a portion taken along line XV-XV in Section B of FIG. 11.

As illustrated in FIG. 15, in another portion of the general mounting piece 61, the general mounting piece 61 is configured not to protrude downward from the roof head liner 5 at the time of completing the inflation of the airbag 20.

An intermediate portion 60b of the end-side mounting piece 62 between the base portion 60a and the mounting portion 60c is formed with substantially semicircular plate-shaped lugs 62a and 62a, which protrude in the front and rear direction, in both peripheries in the front and rear direction. The lugs 62a and 62a are used to set the mounting length dimension LA of the end-side mounting piece 62 from the upper periphery 21a of the airbag body 21 to the mounting hole 60d of the mounting portion 60c to be same as the length dimension LN of the general mounting piece 61 when the folding completion body 81 in which the airbag 20 is folded up is mounted to the vehicle V. That is, when the airbag 20 is folded to bring the lower periphery 21b close to the upper periphery 21a so that the airbag 20 is formed into a folded body 80 (see Section A of FIG. 8) in a rod shape in the front and rear direction, and the length dimension LF of the end-side mounting piece 62 remains long, the end-side mounting piece 62 is mounted at the disposed position of the roof side rail RR which is the same as the height of another general mounting piece 61, a position of the end-side mounting piece 62 in a folded body 80 decreases, and the end-side mounting piece 62 approaches and passes by the lower periphery 5a of the roof head liner 5 or is exposed from the lower periphery 5a, which is not preferable. For this reason, as illustrated in FIG. 9, before the airbag 20 is mounted to the vehicle V, the end-side mounting piece 62 is folded in a bellows manner with a plurality of creases 62b in the front and rear direction of the airbag 20, and the mounting hole 60d is brought close to the upper periphery 21a of the airbag body 21 such that the length dimension LA from the upper periphery 21a to the mounting hole 60d matches with the length dimension LN from the upper periphery 21a of the general mounting piece 61 to the mounting hole 61a. In order to maintain the disposed state, the lugs 62a and 62a abut on an outer circumferential surface 80a (in the embodiment, a position of the upper periphery 21a of a folding portion 78b (to be described later; end-side inflatable portion 35)) of the folded body 80, a folding-collapse preventing member (tape material) 75 with an adhesive property is assembled to be wound on each of the lugs 62a and 62a on the outer circumferential surface 80a of the folded body 80, and the lugs 62a and 62a are interposed between the folding-collapse preventing member 75 and the folded body 80 to be fixed on the outer circumferential surface 80a of the folded body 80. In the case of the embodiment, in order to prevent the folding-collapse of the folded body 80, the folding-collapse preventing member 75 is wound at least one time on the outer circumferential surface of the folded body 80, but the folding-collapse preventing member 75 is easily broken when the airbag body 21 is inflated.

In other words, in the end-side mounting piece 62, that is, the lug mounting piece 62, the disposed position of the lug 62a is set such that the length dimension LA from the upper periphery 62af of the lug 62a to the mounting hole 60d matches with the length dimension LN of the general mounting piece 61 (that is, the lugless mounting piece 61) from the upper periphery 21a of the airbag body 21 to the mounting hole 60d. When the intermediate portion 60b of the lug mounting piece 62 is folded in a bellows manner, and the upper periphery 62af of the lug 62a is configured to be folded in a bellows manner to match with the upper periphery 21a of the airbag body 21, the bellows-superimposed portion 62c is easily formed although the length dimension LF of the lug mounting piece 62 in a flatly deployed state is long, and the height positions HF and HN of the mounting holes 60d of the lug mounting portion (end-side mounting piece) 62 and the lugless mounting piece (general mounting piece) 61 from the upper periphery of the airbag body 21 can be set the same as each other.

Figure 5:
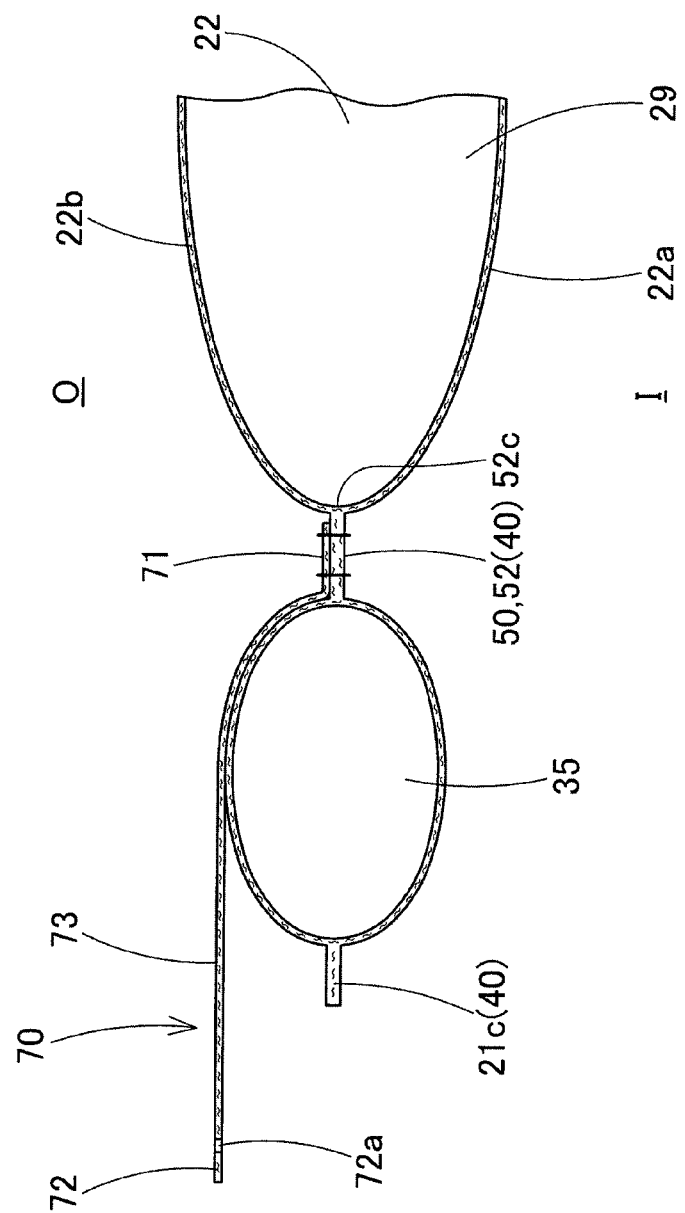
FIG. 5 is a sectional view illustrating the inflated single airbag of the embodiment, and a partially-enlarged sectional view illustrating a portion taken along line V-V of FIG. 2.

The tension cloth 70 is configured of a sheet material having flexibility, and in the case of the embodiment, is formed of the woven fabric of polyimide, polyester, or the like. As illustrated in FIGS. 3 to 5, the tension cloth 70 is disposed on an outboard side O of the end-side inflatable portion 35 at the time of completing the inflation of the airbag body 21. A rear end portion 71 as the base portion is coupled to the vertical closed portion 52 of the boundary closed portion 50 by stitching. In the case of the embodiment, as illustrated in FIGS. 3 and 6, the outer shape of the tension cloth 70 is a substantially triangular plate shape having a base of the rear end portion 71, and the mounting hole 72a is disposed in the front end portion 72 as a tip. The tension cloth 70 is configured to cover the outboard side O of the vertically intermediate portion of the end-side inflatable portion 35 with the intermediate portion 73 between the rear end portion 71 and a rear end portion 72. The rear end portion 72 of the tension cloth 70 forms the mounting portion fixed to a position of the inner panel 2 on the body 1 in the front pillar FP on the front side of the end-side inflatable portion 35. The rear end portion 72 is configured to be fixed to the inner panel 2 using the mounting bracket 11 and the mounting bolt 12 similarly with the mounting piece 60 (see FIG. 13), and includes the mounting hole 72a through which the mounting bolt 12 can be inserted.

In the airbag 20 of the embodiment, when the inflation is completed in the state of being mounted to the vehicle, the protection inflatable portion 25 inflates from a non-inflation state to shorten a width dimension in the front and rear direction. Thus, as illustrated in FIG. 12, a tension T is generated substantially in the front and rear direction between the rear end portion 72 disposed on the tip of the tension cloth 70 and the lugless mounting piece 61B disposed on the rear end side of the airbag body 21.

Figure 7:
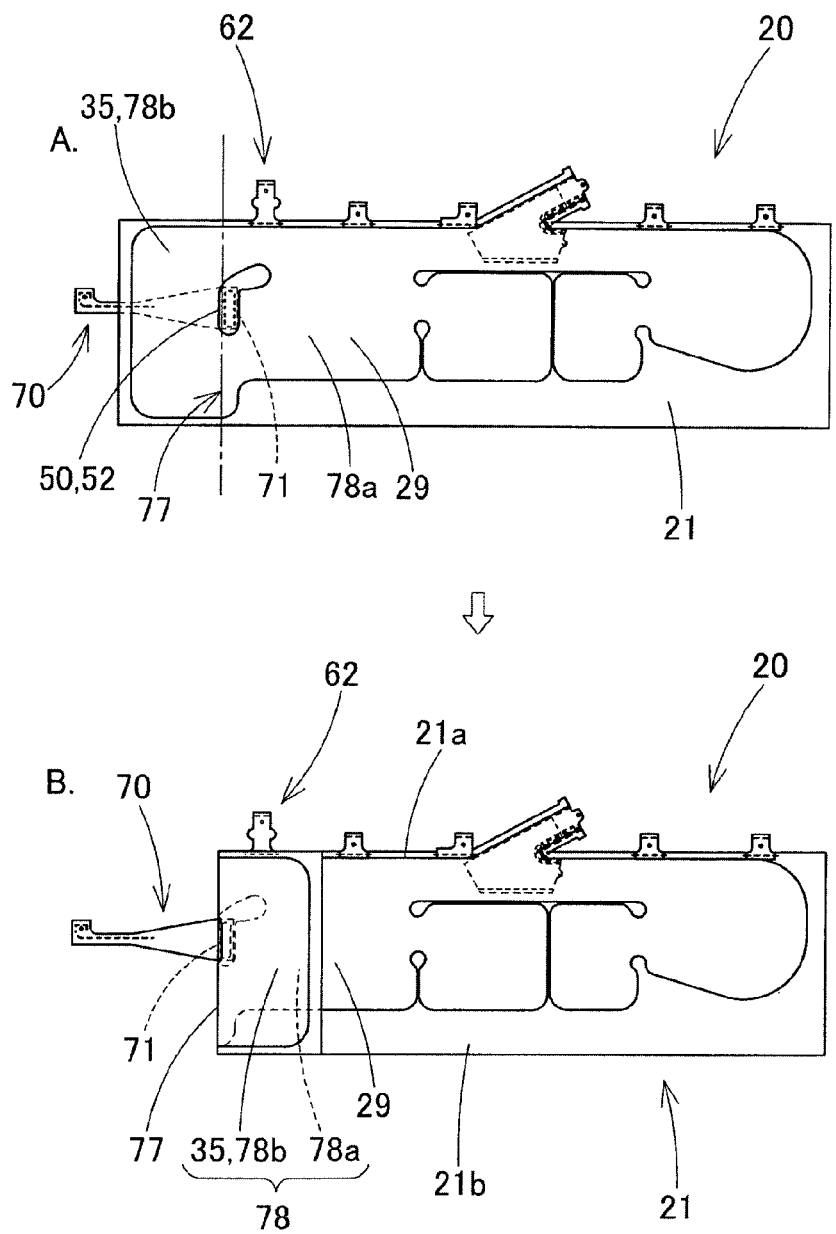
FIG. 7 is a view illustrating a folding process of forming the folding completion body of the embodiment.

Next, the description will be given about mounting the head-protecting airbag device HM of the embodiment on the vehicle V. The airbag body 21 is in a state where the tension cloth 70 is sewed in advance, and the inboard side wall 22a and the outboard side wall 22b are superimposed and flatly deployed. As illustrated in FIG. 7, the crease 77 is provided in the vertical closed portion 52 of the boundary closed portion 50, and the end-side inflatable portion 35 is set as the folding portion 78b and is folded to a folding target portion 78a serving as the inboard side wall 22a on the front main inflatable portion 29 by the crease 77, thereby forming a superimposed portion 78. As illustrated in Section B of FIG. 7 and Section A of 8, the tension cloth 70 and the superimposed portion 78 are folded to bring the lower periphery 21b close to the upper periphery 21a, forming the folded body 80 of the airbag 20.

Figure 8:
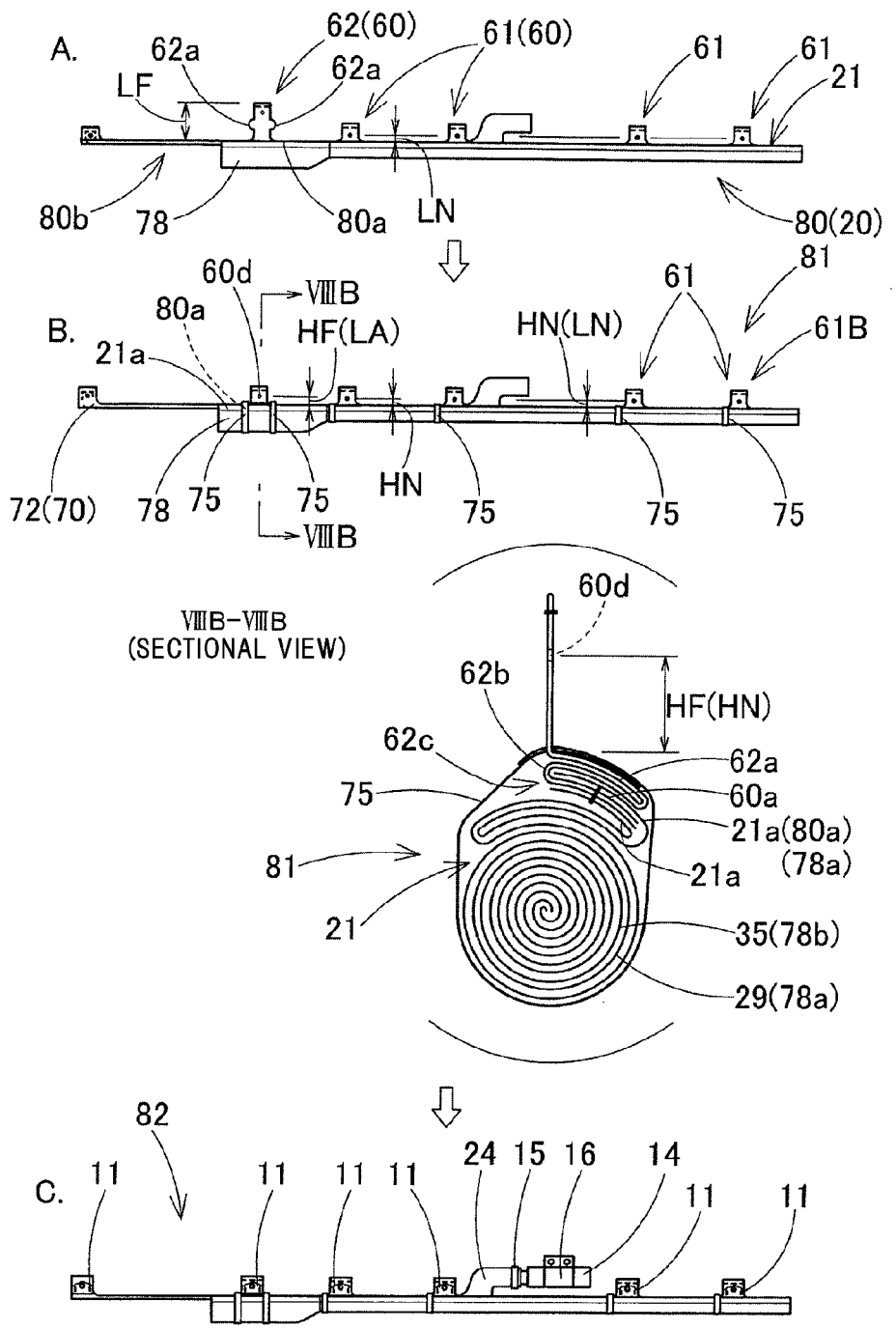
FIG. 8 is a view illustrating a process of forming the folding completion body of the embodiment and a process of forming the airbag assembly body, and illustrate a process after the process in FIG. 7.
Figure 9:
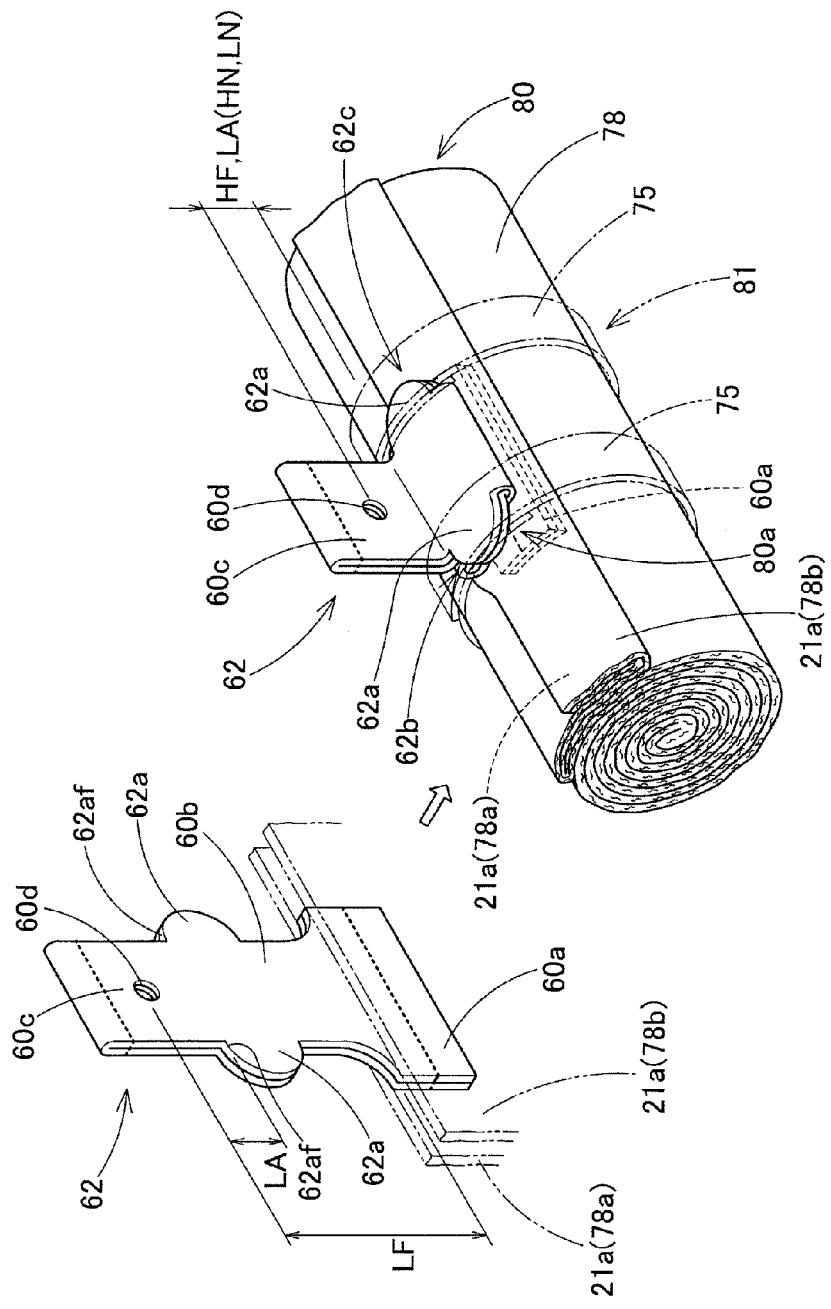
FIG. 9 is a perspective view schematically illustrating a state in which the lug mounting piece of the embodiment is fixed to a folded body.

Next, as illustrated in Section B of FIG. 8, the folded body 80 is wrapped at a predetermined position by the folding-collapse preventing member (tape) 75. As described above, the intermediate portion 60b of the lug (end side) mounting piece 62 is folded in a bellows manner, and the folding-collapse preventing member 75 is wound also on a portion of the lugs 62a and 62a such that the lugs 62a and 62a are fixed on the upper periphery 21a of the airbag body 21 in the outer circumferential surface 80a, thereby forming the folding completion body 81.

After that, as illustrated in Section C of FIG. 8, the mounting bracket 11 is fixedly attached to the mounting portion 72 of the tension cloth 70, the lug mounting piece 62, and each lugless mounting piece 61, and the inflator 14 attached with the mounting bracket 16 is connected with the connection port 24 of the airbag 20 by the clamp 15, forming an airbag assembly 82.

Next, the mounting brackets 11 and 16 are disposed at a predetermined position of the inner panel 2 on the body 1, the lead wire (not illustrated), which extends from the predetermined control device for operating the inflator, is connected to the inflator 14 by fixing the bolts 12 and 17. The front pillar garnish 4 or the roof head liner 5 is mounted to the inner panel 2 on the body 1, and further, the pillar garnishes 6 and 7 are mounted to the inner panel 2 on the body 1. Then, the head-protecting airbag device HM can be mounted on the vehicle V.

Figure 10:
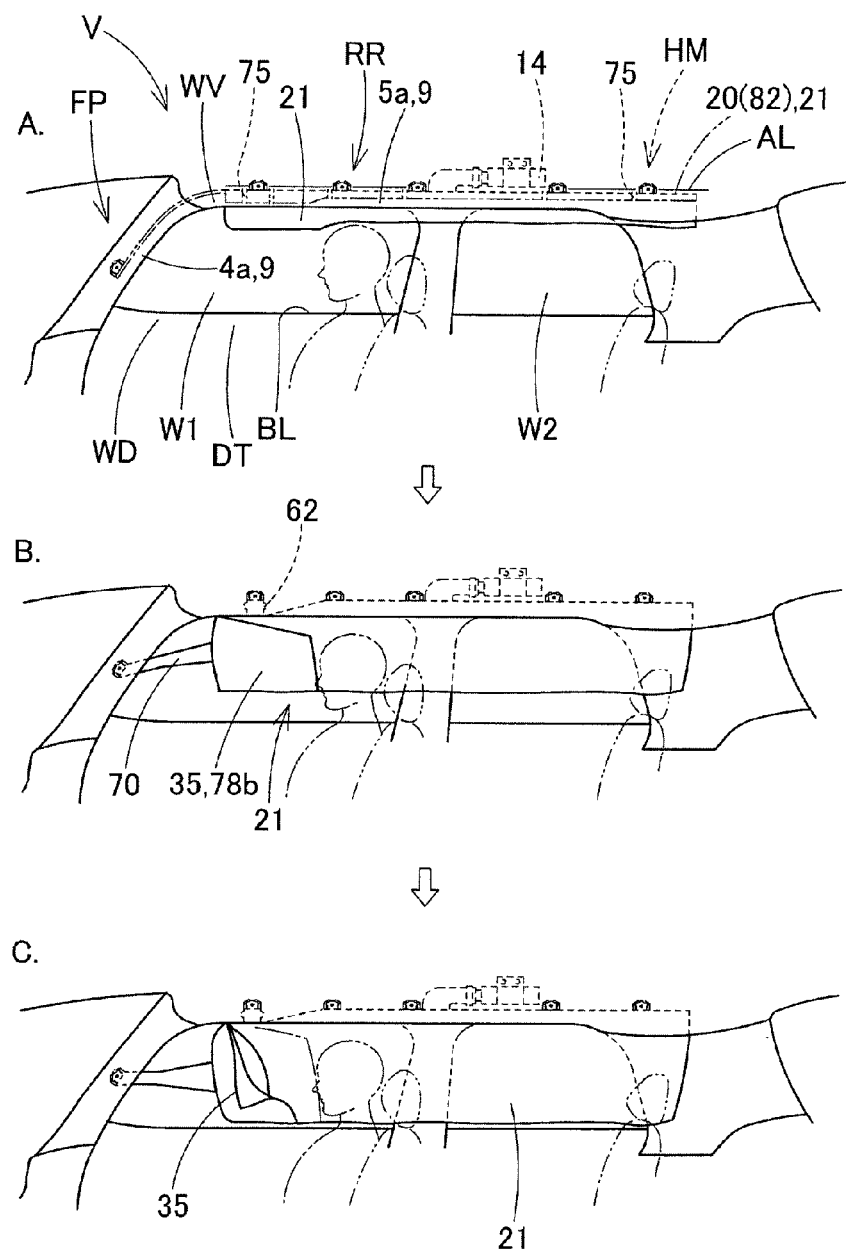
FIG. 10 is a view sequentially illustrating an operation of the head-protecting airbag device using the airbag of the embodiment.
Figure 11:
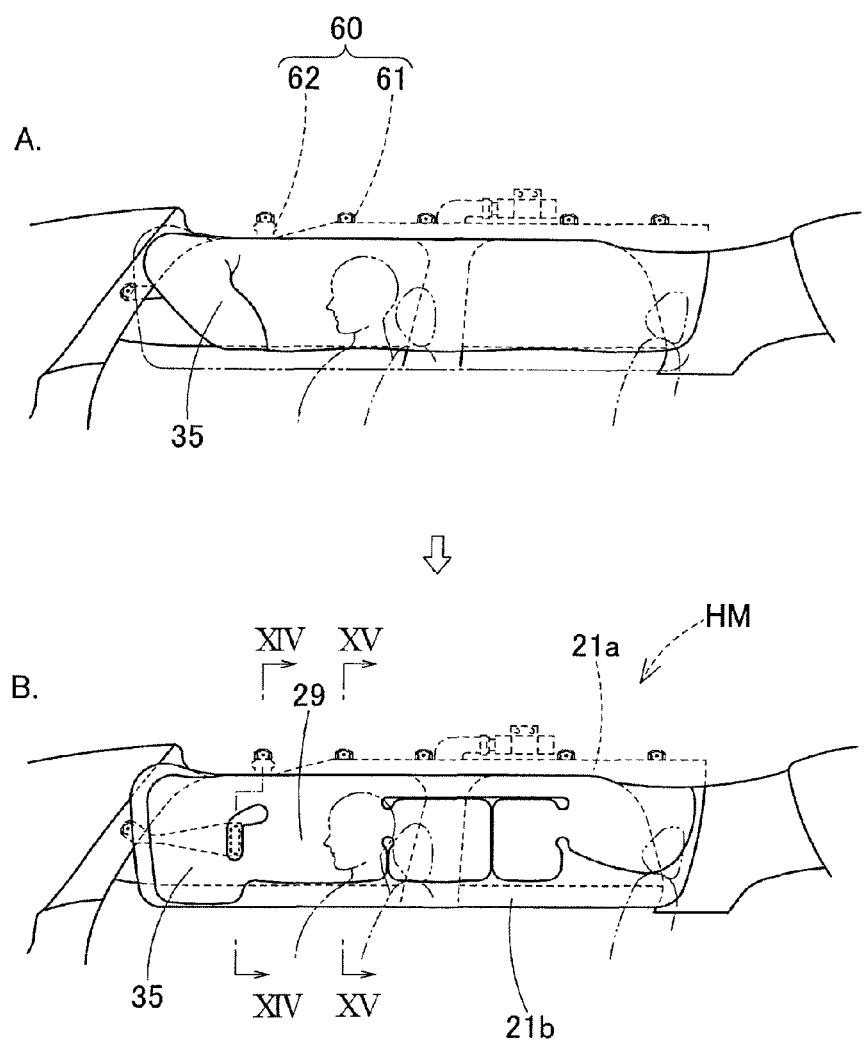
FIG. 11 is a view sequentially illustrating an operation of the head-protecting airbag device of the embodiment and illustrate a state after the operation in FIG. 10.

After the head-protecting airbag device HM is mounted to the vehicle V, the operation signal is received from the control device at the time of the side collision, the oblique collision, or the rollover of the vehicle V, and the inflator 14 is operated. The inflation gas discharging from the inflator 14 flows into the airbag body 21. The inflating airbag body 21 breaks each folding-collapse preventing member 75, resolves the bellows-superimposed portion 62c of the lugless mounting piece 62, presses and opens the airbag cover 9 formed from lower peripheries 4a and 5a of the front pillar garnish 4 and the roof head liner 5, and protrudes downward. As illustrated in FIG. 10, the airbag body 21 resolves the folding of the crease 77, and unfolds the folding portion 78b such that the folding portion is deployed to the lower periphery 21b. As illustrated in the two-dot chain line of FIG. 1, and FIGS. 11 and 12, the airbag body 21 is largely inflated to cover the windows W1 and W2, the front pillar FP, the central pillar CP, and the inboard side I of the rear pillar RP. That is, the main inflatable portions 29 and 30 and the end-side inflatable portion 35 in the airbag body 21 are deployed and the inflation is completed, and further the inflation of the sub inflatable portions 32 and 33 also is completed.

In the folding completion body 81 of the embodiment, the lower periphery 21b of the airbag body 21 is folded to be brought close to the upper periphery 21a, thereby forming the folded body 80. When the folding-collapse preventing member 75 is wound, simply, the mounting piece 62 with the lug 62a is folded and superimposed on the upper periphery 21a of the airbag body 21 in the folded body 80, and is interposed between the folding-collapse preventing member 75 and the folded body 80 using the folding-collapse preventing member 75 wound on the folded body 80, and the lug 62a is fixed to the folded body 80. Comparing to a case where the single mounting piece 62 is shortened by sewing or with the tape material, it is possible to obtain the predetermined folding completion body 81 in the state of preventing the folding-collapse of the folded body 80 simply by shortening the mounting piece 62 with the lug 62a.

Therefore, in the folding completion body 81 of the airbag 20 of the embodiment, the mounting piece 62 can be easily shortened simply using the folding-collapse preventing member 75, and the folding completion body 81 can be configured to be easily mountable to the proper position on the upper periphery WU of the window W1.

In the folding completion body 81 of the embodiment, a plurality (five in the embodiment) of the mounting pieces 60 include the lug mounting piece 62 with the lug 62a, and the lugless mounting piece 61 which is not folded for shortening and does not include the lug 62a.

For this reason, in the embodiment, the operation is completed without shortening the entire mounting piece 60, that is, the operation is completed without shortening the lugless mounting piece 61, and it is possible to improve a freedom degree of disposing the folding-collapse preventing member 75 wound on the folded body 80.

In this case, in the embodiment, in the length dimension of the mounting piece 60 from the base portion 60a on the upper periphery 21a of the airbag body 21 to the mounting portion 60c mounted to the upper periphery WU of the windows W1 and W2, the length dimension LN of the lugless mounting piece 61 is substantially the same as the length dimension LA of the lug mounting piece 62 in a state where the lug 62a is fixed to the folded body 80 by the folding-collapse preventing member 75.

For this reason, in the embodiment, a plurality of the mounting pieces 60 (61 and 62) protruding upward from the folding completion body 81 have the same height positions HN and HF of the mounting hole 60d of the mounting portion 60c from the folded body 80. The vertical space, to which the folding completion body 81 is mounted, on the upper periphery WU of the windows W1 and W2 of the vehicle V is set to be equally small along the entire length of the folding completion body 81. Therefore, the space where the folding completion body 81 is mounted to the vehicle V can be set not to be bulky. The height positions HN and HF of the mounting hole 60d in the mounting portion 60c of the mounting piece 60 (61 and 62) can be aligned to improve mounting operability of the mounting piece 60 (61 and 62).

In the folding completion body 81 of the airbag 20 of the embodiment, the lug 62a is disposed on both sides of the mounting piece 62 with the lug 62a.

For this reason, in the embodiment, the lugs 62a and 62a on both sides can be fixed to the folded body 80 so that the mounting piece 62 folded to be shortened can be stably mounted to the upper periphery WU of the window W1 in an uninclined state.

In consideration of the above-described points, the lug 62a may be not set on only one side, not on both sides of the intermediate portion 60b. The shape of the lug 62a may be set to various shapes such as a long circular plate shape and a rectangular plate shape in addition to the semicircular plate shape of the embodiment.

In the folding completion body 81 of the airbag 20 of the embodiment, the airbag body 21 is disposed to cover the windows (side window) W1 and W2 on the inboard side of the side surface of the vehicle V, and the entire mounting piece 60 (61 and 62) is mounted to the roof side rail RR of the vehicle V.

For this reason, in the embodiment, when the folding completion body 81 is stored in the roof side rail RR, which is a storage portion in the vehicle V, on the upper periphery WU of the windows (side window) W1 and W2 using the entire mounting piece 60 including the mounting piece 62 folded to be shortened, the storage portion is a vertically narrow space, but the length dimension of the long mounting piece 62 with the lug 62a can be set to be shorten, and the vertical width dimension of the folding completion body 81 can be set equally small. As a result, the folding completion body 81 can be smoothly mounted and stored in the roof side rail RR.

In the folding completion body 81 of the airbag 20 in this case, the folded body 80 has the superimposed portion 78 on an end portion 80b (front end portion in the embodiment) in the front and rear direction. The superimposed portion 78 has a folded part formed in such a manner that the folding portion 78b on the end portion 21c of the airbag body 21 is folded to the non-folding portion 78a, which is adjacent to the folding portion 78b and is an intermediate portion on the front main inflatable portion 29, by attaching the vertically-extending crease 77 to the end portion 21c (front end portion in this embodiment) of the flatly deployed airbag body 21 in the front and rear direction. The mounting piece 62 with the lug 62a is disposed in the area of the superimposed portion 78 in the airbag body 21 on the intermediate portion (the non-folding portion 78a). The folding-collapse preventing member 75, in which the lug 62a is fixed to the folded body 80, is disposed to be wound on the folded body 80 at a position of the superimposed portion 78.

For this reason, in the embodiment, although the end-side inflatable portion 35 of the airbag body 21 on the deployed end portion 21c of the superimposed portion 78 is configured to cover the inboard side of the front pillar FP extending from the front peripheral portion 5b of the roof side rail RR to the lower periphery WD of the window W1, the end-side inflatable portion 35 of the inflating airbag body 21 can be stored in the roof side rail RR, not in the pillar FP. For this reason, although there is not a storage space of the airbag body 21 in the pillar FP, it is possible to smoothly cover the inboard side of the pillar FP with the deployed airbag body 21, and it is possible to improve the protective performance of an occupant P.

With the above-described configuration, the superimposed portion 78 can be fixed by the folding-collapse preventing member 75 fixing the lug 62a, and without a separate member for preventing springback, the bulky superimposed portion 78 can be fixed while suppressing the increase of the number of the members.

The airbag 20 of the embodiment includes the airbag body 21 and the plurality of the mounting pieces 60. The airbag body 21 is configured to be mountable on the upper periphery WU of the windows W1 and W2 on the inboard side of the vehicle V and stored in the folded-up state, and to be deployed downward to cover the inboard side of the windows W1 and W2 at the time of inflow of the inflation gas. A plurality of the mounting pieces 60 extend from the upper periphery 21a of the airbag body 21 to mount the airbag body 21 to the upper periphery WU of the windows W1 and W2. At least one mounting piece 62 of the mounting piece 60 includes the lugs 62a and 62a. The lugs protrudes to both sides from the intermediate portion 60b between the base portion 60a on the upper periphery 21a of the airbag body 21 and the mounting portion 60c mounted to the upper periphery WU of the window W1. These lugs 62a and 62a are disposed in a position which can be superimposed on a portion of the airbag 20 on the upper periphery 21a of the airbag body 21 when the mounting piece 62 is folded such that the mounting portion 60c, which is separated from the base portion 60a on the upper periphery 21a of the airbag body 21 and mounted to the upper periphery WU of the window W1, of the mounting piece 62 with the lug 62a is brought close to the upper periphery 21a of the airbag body 21.

For this reason, in the airbag 20 of the embodiment, when the mounting piece 62 is folded to be shortened, the lugs 62a and 62a which can be superimposed on the airbag body 21 protrude to both sides of the intermediate portion 60b between the base portion 60a and the mounting portion 60c in the mounting piece 62 to be shortened. When the folding-collapse preventing member 75, which is wound when airbag body 21 is folded, is wound on the protruding lugs 62a and 62a, the mounting portion 60c of the mounting piece 62 with the lug 62a is simply set to be a stable state without inclined from the airbag body 21, and the mounting piece 62 can be maintained short. For this reason, when the folding completion body 81, which is formed by winding the folding-collapse preventing member 75 on the folded airbag body 21, is mounted on the upper periphery WU of the windows W1 and W2 of the vehicle V, a process to shorten the mounting piece 62 is simply performed.

Therefore, in the airbag 20 of the embodiment, the mounting piece 62 can be easily set to be shortened simply using the folding-collapse preventing member 75. The mounting piece 62 can be appropriately used to the folding completion body 81 configured to be easily mountable to the proper position on the upper periphery WU of the windows W1 and W2.

In the airbag 20 of the embodiment, a plurality of the mounting pieces 60 includes the lug mounting piece 62 with the lug 62a and the lugless mounting piece 61 without the lug 62a. The length dimension LA of the lug mounting piece 62 from the upper periphery 62af of the lug 62a to the mounting hole 60d of the mounting portion 60c is substantially the same as the length dimension LN of the lugless mounting piece 61 from the upper periphery 21a of the airbag body 21 to the mounting hole 60d of the mounting portion 60c.

For this reason, in the embodiment, when the lug 62a is fixed to the folded airbag body 21 using the folding-collapse preventing member 75, the height positions HF and HN of the mounting portion 60c (mounting hole 60d) of the lug mounting piece 62 and the lugless mounting piece 61 on the upper periphery 21a of the airbag body 21 can be set to be substantially the same as each other. For this reason, all the plurality of the mounting pieces 60 protruding upward from the folding completion body 81 have substantially the same height positions HF and HN of the mounting portion 60c (60d) from the upper periphery 21a of the airbag body 21. The vertical space on the upper periphery WU of the windows W1 and W2 of the vehicle V to which the folding completion body 81 is mounted is set to be equally small along the entire length of the folding completion body 81. Therefore, the space where the folding completion body 81 is mounted to the vehicle V can be set to not be not bulky, and the height positions HN and HF of the mounting hole 60d in the mounting portion 60c of the mounting piece 60 is aligned on a mounting line AL in a linear shape in the front and rear direction (see Section A of FIG. 10) so as to improve mounting operability of the mounting piece 60.

In the folding completion body 81 or the airbag 20 of the embodiment, the description has been given about a case in which the lug mounting piece 62 is fixed to the inner panel 2 on the roof side rail RR. In addition to a configuration in which the end-side inflatable portion 35 as the folding portion 78b is folded to the folding target portion 78a on the main inflatable portion 29, the lug mounting piece 62 may be configured to be fixed to the body in the vicinity of the front pillar FP and the roof side rail RR. Even in such a case, the folding-collapse preventing member 75 is broken to lengthen the mounting piece 62, the mounting piece 62 passes the lower periphery 5a of the roof head liner 5 as the airbag cover 9 and the lower end of the lower periphery 4a of the front pillar garnish 4, and the upper periphery 35a of the end-side inflatable portion 35 can be disposed to a position to cover the inboard side of the pillar FP, thereby appropriately covering the occupant P from the pillar FP.

In the folding completion body 81 or the airbag 20 of the embodiment, the description has been given about a case one lug mounting piece 62 is disposed, but a plurality of the lug mounting pieces may be properly disposed. If necessary, the entire disposed mounting piece 60 is set to a lug mounting piece, and the mounting piece 62 with the lug may be shortened to be mounted on the upper periphery WU of the windows W1 and W2 with the folding-collapse preventing member 75 wound on the lug 62a.

In the embodiment, the tape material with the adhesive property is exemplified as the folding-collapse preventing member 75. However, regarding for an amount of the wound folded body 80, the circumference of the folded body 80 may not entirely be wound as long as the folding-collapse can be prevented, and the lug 62 can be fixed. The folding-collapse preventing member 75 may not be the tape material, and may be a band material, a clip, and the like which are broken or deviated to release the engagement between engaged portions in the vicinity of both end portions, or are deformed to resolve the assembly when the folded body 80 (airbag body 21) is inflated. Even with such a folding-collapse preventing member formed as the clip material and the like, the folding-collapse preventing member may be configured to be assembled to the folded body 80 to cover the entire circumference as long as the folding-collapse of the folded body 80 can be prevented, and the lug 62 can be fixed to the surface of the airbag body 21, In the case of the embodiment, the mounting piece 60 is configured to be a separate member from the airbag body 21, but the mounting piece 60 may be integrally formed in the airbag body 21.

What is claimed is:

1. A folding completion body of an airbag, the airbag including: an airbag body configured to be stored on an upper edge of a window on an inboard side of a vehicle in a folded-up state, and to be deployed and inflated downward to cover an inboard side of the window at the time of inflow of an inflation gas; and a plurality of mounting pieces which extend from an upper edge of the airbag body and mount the airbag body to the upper edge of the window, wherein:

the airbag is stored in the upper edge of the window in such a manner that a lower edge of the airbag body in a flatly deployed state is folded to be brought close to the upper edge;

the plurality of mounting pieces are mounted to the upper periphery of the window with at least one of the mounting pieces folded to be shortened;

the lower edge of the airbag body in a flatly deployed state is folded to be brought close to the upper edge so as to form a folded body;

a folding-collapse preventing member is assembled to the folded body;

the mounting piece folded to be shortened has a lug which protrudes sideward between a base portion on the upper edge of the airbag body and a mounting portion mounted on the upper edge of the window; and the mounting piece with the lug is folded and superimposed to the upper edge of the airbag body in the folded body, and the lug is interposed between the folding-collapse preventing member assembled to the folded body and a surface of the folded body so as to be fixed to the folded body.

2. The folding completion body of the airbag according to claim 1, wherein the plurality of mounting pieces includes a lug mounting piece with the lug and a lugless mounting piece which is not folded for shortening.

3. The folding completion body of the airbag according to claim 2, wherein in a length dimension of the mounting piece from the base portion on the upper edge of the airbag body to the mounting portion mounted to the upper edge of the window, a length dimension of the lugless mounting piece is substantially the same as a length dimension of the lug mounting piece in a state where the lug is fixed to the folded body by the folding-collapse preventing member.

4. The folding completion body of the airbag according to claim 1, wherein the lug is disposed on both sides of the mounting piece with the lug.

5. The folding completion body of the airbag according to claim 1, wherein:

the airbag body is disposed to cover the window on the inboard side of the side surface of the vehicle; and all of the plurality of mounting pieces are the entire mounting piece is mounted to a roof side rail of the vehicle.

6. The folding completion body of the airbag according to claim 5, wherein:

the folded body includes a superimposed portion on an end portion in a front and rear direction;

the superimposed portion has a folded part formed by folding and superimposing the end portion of the flatly deployed airbag body in the front and rear direction on an intermediate portion adjacent to the end portion of the airbag body by attaching a crease extending vertically;

the mounting piece with the lug is disposed in an area of the superimposed portion on the intermediate portion of the airbag body; and the folding-collapse preventing member fixing the lug to the folded body is disposed to be assembled to the superimposed portion of the folded body.

7. An airbag comprising:

an airbag body which is configured to be mounted to an upper edge of a window on an inboard side of a vehicle and stored in a folded-up state, and to be deployed downward to cover an inboard side of a window at the time of inflow of an inflation gas; and a plurality of mounting pieces which extend from an upper edge of the airbag body and mount the airbag body to the upper edge of the window, wherein:

at least one of the mounting pieces includes a lug which protrudes to both sides between a base portion on the upper edge of the airbag body and a mounting portion mounted to the upper edge of the window; and the lug is disposed in a position which can be superimposed on a portion of the airbag on the upper edge of the airbag body when the mounting piece is folded such that the mounting portion, which is separated from the base portion on the upper edge of the airbag body and mounted to the upper periphery of the window, of the mounting piece with the lug is brought close to the upper edge of the airbag body.

8. The airbag according to claim 7, wherein:

a plurality of the mounting pieces include a lug mounting piece with the lug and a lugless mounting piece without the lug; and a length dimension of the lug mounting piece from an upper periphery of the lug to the mounting portion is substantially the same as a length dimension of the lugless mounting piece from the upper edge of the airbag body to the mounting portion.

* * * * *